Feb. 15, 1949.  A. L. J. QUENEAU  2,461,697
RECOVERY OF ZINC FROM ITS ORES
Filed Sept. 23, 1947
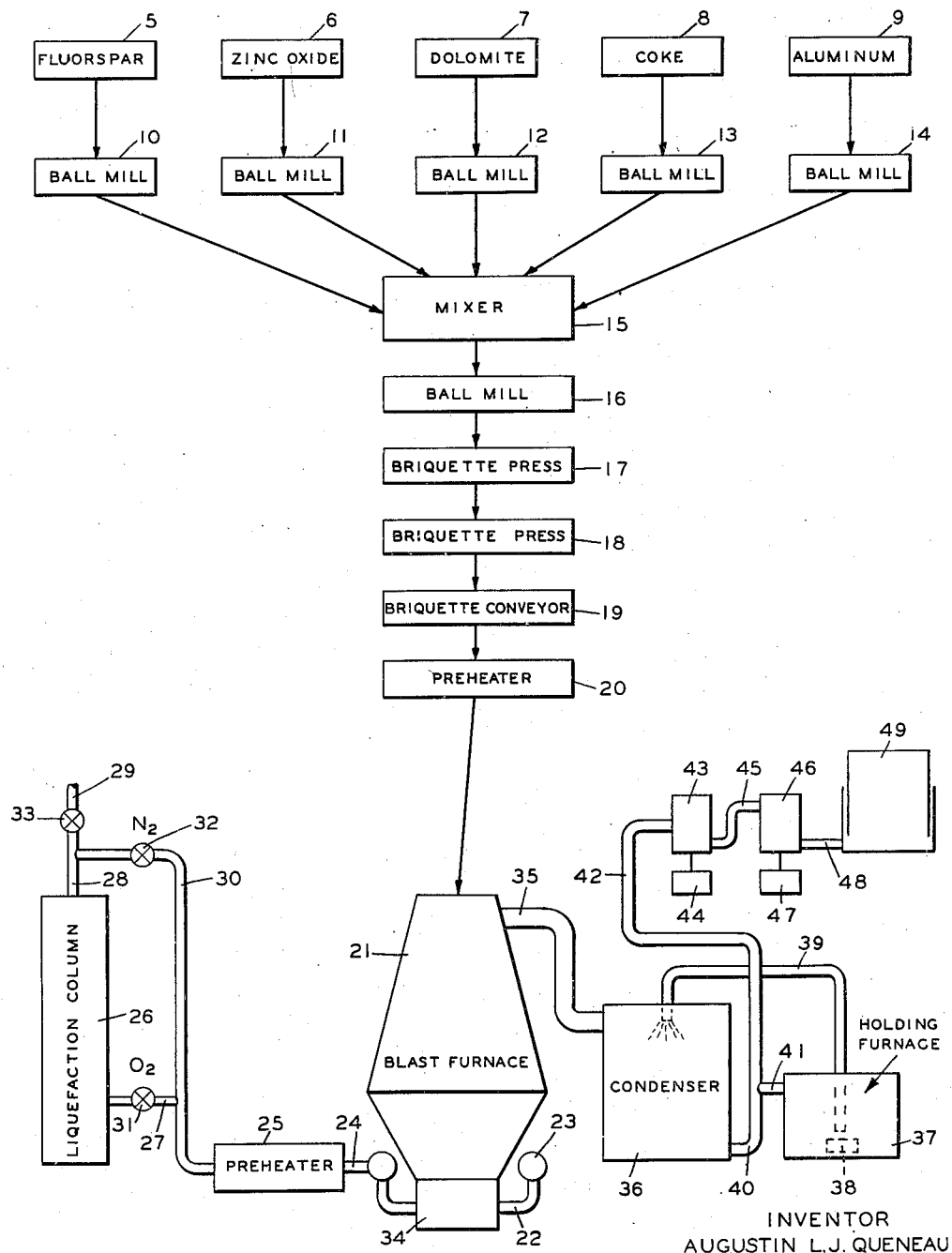
INVENTOR
AUGUSTIN L.J. QUENEAU
BY
ATTORNEYS Patented Feb. 15, 1949

2,461,697

UNITED STATES PATENT OFFICE 2,461,697

RECOVERY OF ZINC FROM ITS ORES

Augustin L. J. Queneau, Morristown, N. J.

Application September 23, 1947, Serial No. 775,632

21 Claims. (Cl. 75—87)

This invention relates to the recovery of zinc from its ores, and particularly to the reduction of zinc in a blast furnace.

Because of its peculiar characteristics, the reduction of zinc presents problems which are quite different from those arising in the smelting of other metals. Thus, zinc is volatile at the temperature of reduction. Moreover, at that temperature it is readily oxidizable. For example, in the presence of carbon dioxide, the zinc is reoxidized to zinc oxide. Since zinc is not recovered as a molten metal in the smelting furnace but must be separated by condensing its vapor from the gases leaving the furnace, it is evident that the smelting operation must be conducted so as to afford the maximum concentration of zinc vapor in the furnace gases.

There have been numerous attempts to smelt zinc-containing materials in a blast furnace because of the economy of blast furnace operation as compared with the use of retorts or other available procedures. None of these attempts have been successful heretofore because the use of coke as a reducing agent does not afford furnace gases containing a sufficient proportion of zinc vapor.

It is the object of the present invention to provide a satisfactory and commercially practicable method of reducing zinc-containing material in a blast furnace, thereby affording economies which are not available in methods heretofore practised.

Another object of the invention is the provision of an improved method of smelting zinc-containing materials whereby substantially all of the zinc, together with valuable byproducts of the operation, can be recovered.

Other objects and advantages of the invention will be apparent as it is better understood by reference to the following specification and the accompanying drawing, which illustrates diagrammatically the preferred procedure in accordance with the present invention.

In carrying out the invention, as hereinafter described in more detail, the principal reduction material employed is selected for three reasons.

1. It must have a high heat of formation of its oxide, much higher than the heat of reduction of zinc oxide.

2. The products of reactions must not be gaseous, with the exception of the reduced zinc vapor.

3. The reduction material must be of economic use.

Thus aluminum, silicon, magnesium and some carbides and silicides may be used, however, aluminum is practically the only one available on account of the usual costs.

Some carbon, preferably in the form of coke, is utilized. The mixture of 1.3 mols of ZnO and 1.0 mol of carbon together with the mixture of 3.0 mols of ZnO and 2 mols of aluminum is balanced approximately thermodynamically. Aluminum could not be used by itself owing to the enormous liberation of heat units that would result in explosive activity.

The carbon mixed in the charge acts as a moderator for the extremely active aluminum: its presence acts as a brake to prevent any runaway reaction, in fact a small excess of zinc oxide in the charge is also beneficial as any zinc oxide unreduced would be absorbed in the slag and would be totally reduced by the carbon in contact with the slag in the hearth.

A hard burned sinter of zinc oxide, prepared in the usual way, is mixed with aluminum powder, for example, dry coke powder, a powdered flux preferably containing magnesium and calcium such as dolomite, with or without the addition of small amounts of fluorspar, and is smelted with a blast consisting essentially of oxygen and nitrogen free from moisture and carbon dioxide. Preferably the mixture is formed into small briquettes which may be sealed by the application of sodium silicate or other similar binder. The briquettes may be preheated, if desired, and delivered by a conveyor to the blast furnace.

The blast, as indicated, consists of nitrogen and oxygen with a proportion of oxygen considerably in excess of that present in atmospheric air. The blast is supplied preferably with oxygen and nitrogen from an air liquefaction system and is, therefore, free from moisture and carbon dioxide. Preferably a mixture of 50% nitrogen and 50% oxygen is employed, and for convenience the calculations hereinafter presented will be based upon such proportions, but the proportions of oxygen may vary from about 35% upwardly to the largest proportion which can be used without relatively rapid destruction of the furnace at the tuyère line because of the high heat developed in this zone. Theoretically, 100% oxygen is ideal from the standpoint of reduction of the zinc, but it is not practicable at the present time with materials available for furnace construction. 60% oxygen is probably the upper limit for practical operation with available furnace materials. The blast may be preheated or not as desired.

The reduced zinc is withdrawn as vapor with the gases leaving the blast furnace and is condensed in any suitable condenser. Preferably, condensation is effected by contact of the gases and zinc vapors with molten zinc which is circulated from a source thereof as described, for example in my application Serial No. 768,392 filed August 13, 1947. This procedure ensures economical condensation of substantially all of the zinc vapor, recovery of any zinc remaining in the form of zinc oxide or blue powder, and of the gas which has a relatively good calorific value. The latter may be used for preheating the blast, the solid material entering the blast furnace, and for other purposes.

Aluminum has a relatively low vapor pressure at the temperatures maintained in the blast furnace, and consequently any aluminum which is not consumed will settle to the hearth of the furnace. It will there react with any unreduced zinc oxide and with silica and magnesia.

Some iron is always present, being introduced as a part of the coke and of the zinc ore charged. The iron will accumulate in the hearth as silvery pig iron of high silicon composition. This product is highly desirable and may be withdrawn for use as a byproduct of the operation.

While at first glance it may appear to be uneconomical to employ an expensive metal such as aluminum to reduce a cheaper metal such as zinc, examination of the facts will dispel this conclusion. The molecular weight of aluminum is 27, and that of zinc, 65.4. From the equation $$3ZnO + 2Al = Al_2O_3 + 3Zn$$

it is seen that one part of aluminum will reduce 3.63 parts of zinc from zinc oxide. Moreover, it is not necessary to use pure commercial aluminum for the purpose. There are always available large quantities of turnings and borings of aluminum and aluminum alloys such as "Duralumin" in the scrap market at a price of from 2 to 4 cents per pound. Such material is entirely suitable for the purpose of the invention, and the supply is likely to increase, due to the demand for aluminum products. Hence aluminum as a reducing agent is entirely practicable for the purpose of the present invention.

In order to ensure fluidity of the slag, it is desirable to use a flux containing a substantial proportion of magnesium with calcium. Calcium alone produces a slag which is likely to be too viscous, but with the normal proportion of magnesium which is present in dolomite, the slag will be sufficiently fluid. Small amounts of fluorspar can be added to increase the fluidity of the slag, if necessary.

The slag is an aluminate of calcium and magnesium, in which the alumina acts as an acid. It should have substantially the following composition:

```
35 Al2O3
15 SiO2
20 MgO
25 CaO
 5 CaF2
```

Such a slag is highly fluid at a temperature of 1300° to 1400° C. Of course, the composition of the slag may vary, particularly with higher proportions of CaO and with the elimination of calcium fluoride.

The charge to the blast furnace may have approximately the following molar composition:

| | Mols |
|---|---|
| ZnO to be reduced by 1 mol of carbon | 1.3 |
| ZnO to be reduced by 2 mols of aluminum | 3 |
| Carbon for preheating the burden | 1.2 |
| Carbon for maintaining the blast furnace at an operating temperature | 2.0 | or a total of

| | Mols |
|---|---|
| ZnO | 4.3 |
| Carbon | 4.5 |
| Aluminum | 2.0 |

The blast will require 3.2 mols of oxygen and 3.2 mols of nitrogen such as 50% oxygen and 50% nitrogen.

The gaseous products of the reduction and of combustion will consist substantially of

| | Mols |
|---|---|
| Zinc vapor or 35.5% zinc | 4.3 |
| Carbon monoxide or 37.2% carbon monoxide | 4.5 |
| Nitrogen or 27.3% nitrogen | 3.3 |

The permanent gases, after condensation of all of the zinc vapor, should have the composition

| | Per cent |
|---|---|
| Carbon monoxide | 57.7 |
| Nitrogen | 42.3 |

This gas would have a calorific value of 196 B. t. u. per cubic foot, and as indicated it may be recovered and utilized for heating purposes in the plant.

Referring to the drawing, 5, 6, 7, 8 and 9 represent respectively supplies of fluorspar, zinc oxide, dolomite, coke and aluminum. These materials are each ground in ball mills 10, 11, 12, 13 and 14 to a relatively finely divided condition, for example 100 mesh, and are delivered to a mixer 15 in proper proportions to afford the correct mixture as hereinbefore described.

It is desirable to mill all the materials together in one single ball mill, because of the danger of dust explosions with aluminum and coke when crushed alone. The presence of a large proportion of inert materials such as zinc oxide, lime, or dolomite would effectively prevent any explosion if any of the fine dust escaped from the mill and became exposed to flame or spark.

After thorough mixing, the mixture is preferably reground in a ball mill 16 and is then delivered to a briquette press 17. A second briquette press 18 is preferably provided in order to ensure thorough compression of the briquettes, which are of relatively small size, preferably ¾ × ¾ × ½ inch.

After formation, the briquettes are delivered to a conveyor 19. On the conveyor, the briquettes may be sprayed with a small amount of a thick solution of sodium silicate, after which they are delivered to a tunnel preheater 20 which is maintained preferably at a temperature of about 600° C. As a result, the sodium silicate fuses and spreads fully over the briquettes, fritting and sealing them against atmospheric agents such as moisture and carbon dioxide. Any other suitable sealing agent may be employed.

From the preheater 20, the briquettes are delivered as required to a blast furnace 21 provided with tuyères 22 supplied by bustle pipe 23. The proper mixture of oxygen and nitrogen is delivered to the bustle pipe 23 by a pipe 24 connected with a preheater 25. The gaseous mixture of nitrogen and oxygen in the proper proportions is obtained from a liquefaction column 26 of the usual type in which air is subjected to liquefaction and rectification. Oxygen is delivered through a pipe 27, and nitrogen through a pipe 28. A part of the nitrogen is discharged through a pipe 29, and the balance necessary to afford the proper proportion of nitrogen in the mixture is delivered through a pipe 30 which joins the pipe 27. Valves 31, 32, and 33 permit regulation of the flow of gases to ensure proper proportions of nitrogen and oxygen in the mixture employed as the blast for the furnace.

Reduction is continuous in the blast furnace, and slag accumulates in the hearth 34 and may be withdrawn from time to time, together with the silvery pig iron which likewise descends to the hearth.

The use of a carbon lining is preferred for the blast furnace. Carbon is neutral to zinc; it is infusible, and it is protected from oxidation by the ever present column of the charge filling the furnace. The resultant high temperature due to the high oxygen contents of the blast merely increases proportionately the rate of reaction in the furnace. It is known that the zone of combustion is some twenty inches away from the nose of the tuyères, the combustion taking place immediately directly to carbonic oxide.

The furnace is lined with carbon blocks to the level of the gas outlet of the blast furnace leading to the adjacent condenser, to allow the maintenance of a high level of temperature—950° to 1000° C.—in the upper part of the furnace, due to the high heat conductivity of the carbon lining. This high temperature is required to prevent the reversible reaction of $$2CO \rightleftharpoons C + CO_2$$

which occurs at increasing rates as the temperature of the gas falls below 1000° C. The formation of $CO_2$ would also result in the oxidation of some of the zinc vapor and especially would tend to form important proportions of blue powder.

The gaseous products of combustion and reduction are withdrawn through a pipe 35 connected to the top of the blast furnace 21 and are delivered to a condenser 36. As shown in the drawing, the condenser is that described in my earlier application, although, as indicated, any other condenser may be utilized. In accordance with my invention, molten zinc is circulated from a holding furnace 37 by a pump 38 through a pipe 39 and is delivered as a spray at the top of the condenser 36. Contact of the permanent gases and zinc vapors with the spray of zinc results in condensation of the zinc which accumulates in the bottom of the condenser and is forced by the pressure of the gas upwardly through a pipe 40 from which it overflows through a pipe 41 into the holding furnace 37. The gases continue through a pipe 42 to a wet separator 43. Contact with water supplied to the separator results in separation of most of the zinc oxide and blue powder which may be present. The latter is separated at 44 and may be returned for combination with zinc oxide to be reintroduced to the blast furnace. The gas thus freed from solid particles is delivered by a pipe 45 to a baghouse 46, where any remainder of solid particles is separated and recovered at 47. This material may also be returned for re-use. The permanent gases escape through a pipe 48 to a gas holder 49 from which the gas may be withdrawn as required for use as a heating agent.

From the foregoing, it will be observed that I have developed a procedure which permits the successful smelting of zinc-containing materials such as zinc oxide in a blast furnace utilizing aluminum as the principal reducing agent and carbon as an agent for maintaining a portion of the heat necessary in conducting the operation. The use of a blast consisting of oxygen in excess of that present in atmospheric air ensures the maintenance of the operation. The source of nitrogen and oxygen eliminates any possibility of moisture and of carbon dioxide in the blast, since these elements are eliminated in the liquefaction and separation of the constituents of air. The proportions of carbon and aluminum in the burden ensure that the thermal reactions of the reduction by carbon and by aluminum are substantially in balance, the endothermic carbon reduction being neutralized by the exothermic reaction of the reduction of zinc oxide by aluminum. The method provides conditions for a high percentage of zinc vapor in the mixture of vapor and non-condensible gases which escape from the blast furnace.

The procedure as described is economical and especially so in comparison with other available methods of recovering zinc from its ores.

While I prefer to employ aluminum as a reducing agent, other metals and metallurgical products may be substituted therefor, such as silicon as ferrosilicon, and calcium silicide. These materials reduce zinc from its oxide without the liberation of gaseous reaction products. Other possible reducing agents producing a minimum of gaseous products are calcium carbide and silicon carbide. However, all of these products are not commercially available at a cost which at present would permit substitution thereof for aluminum in an economical procedure.

Various changes may be made in the method and the apparatus as described without departing from the invention or sacrificing the advantages thereof.

I claim:

1. The method of reducing zinc-containing materials which comprises smelting a mixture of the zinc-containing material with carbon, aluminum and a flux, and delivering to the smelting zone a blast consisting of oxygen and nitrogen free from moisture and carbon dioxide.

2. The method of reducing zinc-containing materials which comprises smelting a mixture of the zinc-containing material with carbon, aluminum and a flux, and delivering to the smelting zone a blast consisting of oxygen and nitrogen free from moisture and carbon dioxide obtained by the liquefaction and rectification of atmospheric air.

3. The method of reducing zinc-containing materials which comprises smelting a mixture of the zinc-containing material with carbon, aluminum and a flux, delivering to the smelting zone a blast consisting of oxygen and nitrogen free from moisture and carbon dioxide and condensing the zinc vapor from the gases resulting from the smelting operation.

4. The method of reducing zinc-containing materials which comprises smelting a mixture of the zinc-containing material with carbon, aluminum and a flux, and delivering to the smelting zone a preheated blast consisting of oxygen and nitrogen free from moisture and carbon dioxide.

5. The method of reducing zinc oxide which comprises smelting a mixture of zinc oxide with carbon, aluminum and a flux, and delivering to the smelting zone a blast consisting of oxygen and nitrogen free from moisture and carbon dioxide.

6. The method of reducing zinc oxide which comprises smelting a mixture of zinc oxide with carbon, aluminum and a flux, and delivering to the smelting zone a blast consisting of from 35 to 60% of oxygen and the balance of nitrogen free from moisture and carbon dioxide.

7. The method of reducing zinc oxide which comprises smelting a mixture of zinc oxide with carbon, aluminum and a flux, and delivering to the smelting zone a blast consisting of 50% oxygen and 50% nitrogen free from moisture and carbon dioxide.

8. The method of reducing zinc-containing materials which comprises smelting a briquetted mixture of the zinc-containing material with carbon, aluminum and a flux, and delivering to the smelting zone a blast consisting of oxygen and nitrogen free from moisture and carbon dioxide.

9. The method of reducing zinc-containing materials which comprises smelting a briquetted mixture of the zinc-containing material with carbon, aluminum and a flux, and delivering to the smelting zone a preheated blast consisting of oxygen and nitrogen free from moisture and carbon dioxide.

10. The method of reducing zinc-containing materials which comprises smelting a briquetted mixture of the zinc-containing material with carbon, aluminum and a flux, and delivering to the smelting zone a blast consisting of oxygen and nitrogen free from moisture and carbon dioxide, obtained by the liquefaction and rectification of atmospheric air.

11. The method of reducing zinc-containing materials which comprises smelting a briquetted mixture of the zinc-containing material with carbon, aluminum and a flux, delivering to the smelting zone a blast consisting of oxygen and nitrogen free from moisture and carbon dioxide, and condensing the zinc vapor from the gases resulting from the smelting operation.

12. The method of reducing zinc oxide which comprises mixing finely divided zinc oxide, carbon, aluminum and a flux, briquetting the mixture and delivering the briquettes to a smelting zone in the presence of a blast consisting of oxygen and nitrogen free from moisture and carbon dioxide.

13. The method of reducing zinc oxide which comprises mixing finely divided zinc oxide, carbon, aluminum and a flux, briquetting the mixture, preheating the briquettes, and delivering the briquettes to a smelting zone in the presence of a blast consisting of oxygen and nitrogen free from moisture and carbon dioxide.

14. The method of reducing zinc oxide which comprises mixing finely divided zinc oxide, carbon, aluminum and a flux containing magnesium and calcium, briquetting the mixture and delivering the briquettes to a smelting zone in the presence of a blast consisting of oxygen and nitrogen free from moisture and carbon dioxide.

15. The method of reducing zinc oxide which comprises mixing finely divided zinc oxide, carbon, aluminum and a flux containing magnesium and calcium, briquetting the mixture, preheating the briquettes and delivering the briquettes to a smelting zone in the presence of a blast consisting of oxygen and nitrogen free from moisure and carbon dioxide.

16. The method of reducing zinc oxide which comprises mixing finely divided zinc oxide, carbon, aluminum and a flux containing magnesium and calcium, briquetting the mixture and delivering the briquettes to a smelting zone in the presence of a blast consisting of oxygen and nitrogen free from moisture and carbon dioxide, and condensing the zinc vapor from the gases resulting from the smelting operation.

17. The method of reducing zinc oxide which comprises mixing finely divided zinc oxide, carbon, aluminum and a flux containing magnesium and calcium, briquetting the mixture and delivering the briquettes to a smelting zone in the presence of a preheated blast consisting of oxygen and nitrogen free from moisture and carbon dioxide.

18. The method of reducing zinc oxide which comprises mixing finely divided zinc oxide, carbon, aluminum and a flux containing magnesium and calcium, briquetting the mixture and delivering the briquettes to a smelting zone in the presence of a blast consisting of oxygen and nitrogen free from moisture and carbon dioxide, obtained by liquefaction and rectification of atmospheric air.

19. The method of reducing zinc oxide which comprises mixing the zinc oxide in the proportion of 4.3 mols with 4.5 mols of carbon, 2.0 mols of aluminum and a flux containing calcium and magnesium, briquetting the mixture and delivering the briquettes to a smelting zone in the presence of a blast of oxygen and nitrogen.

20. The method of reducing zinc oxide which comprises mixing the zinc oxide in the proportion of 4.3 mols with 4.5 mols of carbon, 2.0 mols of aluminum and a flux containing calcium and magnesium, briquetting the mixture and delivering the briquettes to a smelting zone in the presence of a blast of oxygen and nitrogen containing substantially 35% to 60% of oxygen and the balance nitrogen.

21. The method of reducing zinc-containing materials which comprises smelting a mixture of the zinc-containing material with a material having a high heat of oxide formation exceeding the heat of reduction of zinc oxide, carbon and a flux in the presence of a blast consisting of oxygen and nitrogen free from moisture and carbon dioxide.

AUGUSTIN L. J. QUENEAU.

REFERENCES CITED

The following references are of record in the file of this patent:

UNITED STATES PATENTS

| Number | Name | Date |
|---|---|---|
| 1,507,152 | Berglund | Sept. 2, 1924 |
| 1,583,933 | Kirby | May 11, 1926 |
| 2,179,823 | Kemmer | Nov. 14, 1939 |
| 2,208,586 | Kemmer | July 23, 1940 |
| 2,396,658 | Hybinette et al. | Mar. 19, 1946 |